3,109,676
AUTOMATIC RELEASE HOOK ASSEMBLY
George Kenneth Mercer, Exhall, Coventry, England, assignor to Dunlop Rubber Company Limited, London, England, a British company
Filed Mar. 7, 1962, Ser. No. 178,096
Claims priority, application Great Britain Mar. 7, 1961
11 Claims. (Cl. 294—84)

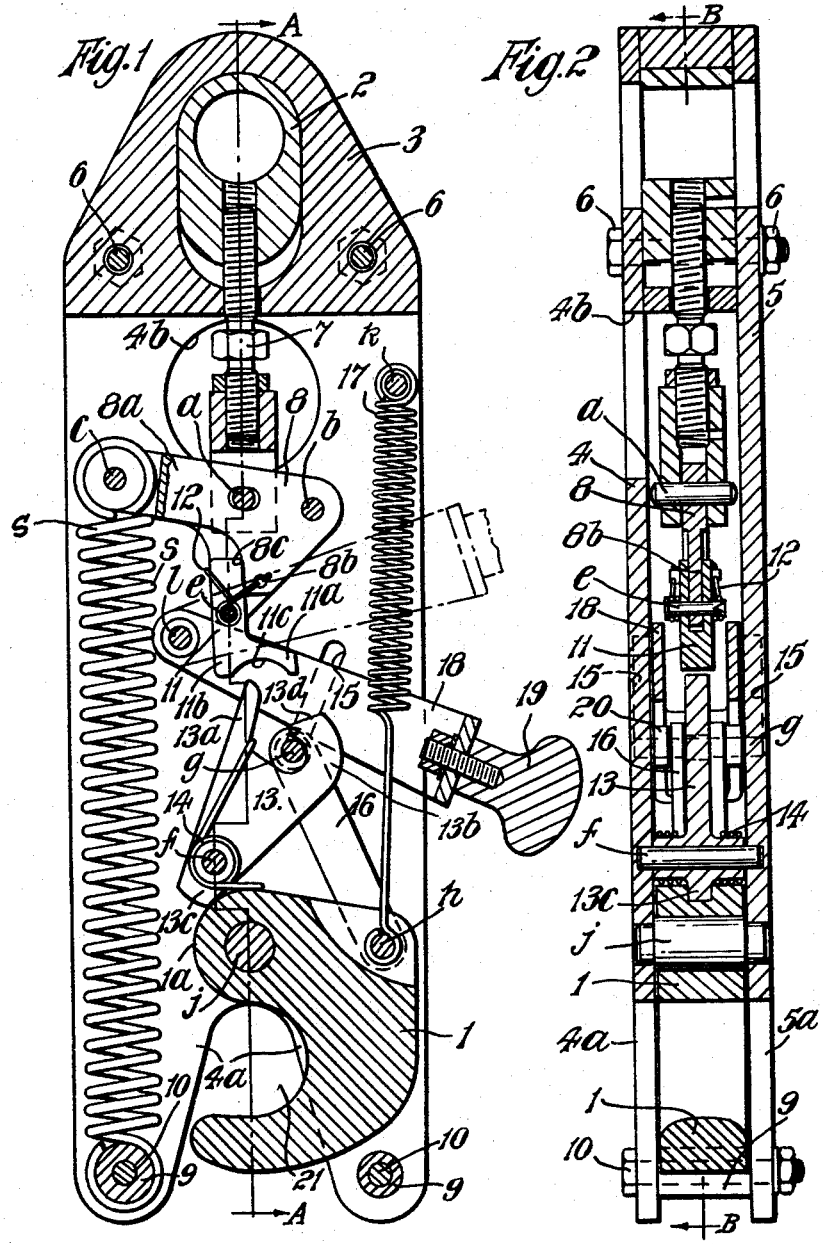

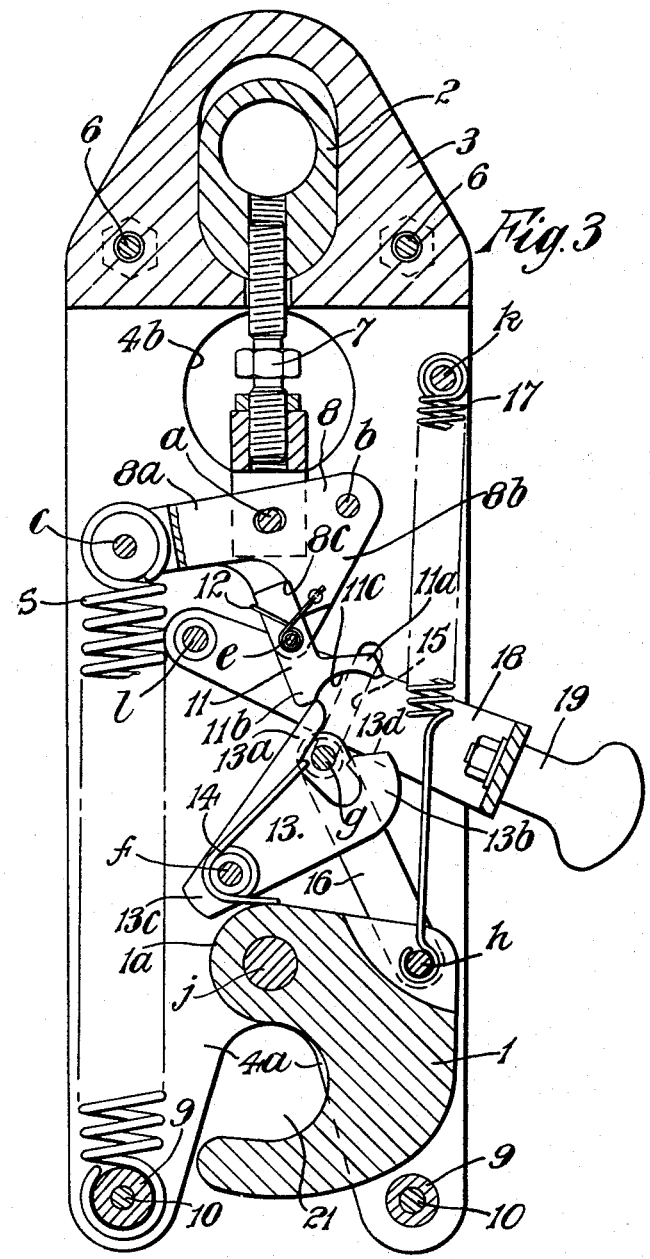

This invention relates to release hook assemblies used primarily for launching fully loaded liferafts from a ship's davit.

Known types of release hook assemblies may be locked by hand but when the full load is taken the hook locking mechanism releases and the hook remains operative as a hook only by reason of the friction imposed on it by the load it supports.

The object of the present invention is to provide an improved form of release hook assembly.

According to the present invention an automatic release hook assembly for carrying a load comprises a body, a shackle retaining hook, means to lock said hook in a shackle retaining position until the load is reduced below a first predetermined value, and spring means to withdraw said hook from said shackle when the load is reduced below a second predetermined value.

Preferably the hook assembly is provided with a hand locking mechanism to engage the hook with a shackle and to lock it in that position and is cocked prior to unlocking by the action of taking the load it is intended to carry.

The assembly preferably comprises a lock member pivotable between a locking position and an unlocking position and a lever operable to move the lock member from a locking to an unlocking position mounted on a bell crank lever itself pivotable on the body of the assembly over a limited range of movement. Between the ends of the range of movement the bell crank member is balanced by the load and the force exerted by a spring. Unlocking movement of the locking member permits a sliding pin to move along guides on shackle release movement of the hook, the pin and hook being pivotably connected together by an intermediate member. The load to be carried by the hook assembly is preferably a liferaft and both the said predetermined loads on the assembly are determined in part to the buoyancy of the liferaft on the water.

The preferred embodiment of the invention will now be described with reference to the accompanying drawings of which:

FIGURE 1 shows the hook assembly in the fully loaded and locked position the view being a cross-section on the line B—B of FIGURE 2, looking in the direction of the arrows;

FIGURE 2 is a vertical section through the hook assembly on the line A—A of FIGURE 1 as viewed in the direction of the arrows;

FIGURE 3 is a view of the hook assembly similar to FIGURE 1 when bearing a load the value of which is intermediate the first and second predetermined loads;

Figure 4:
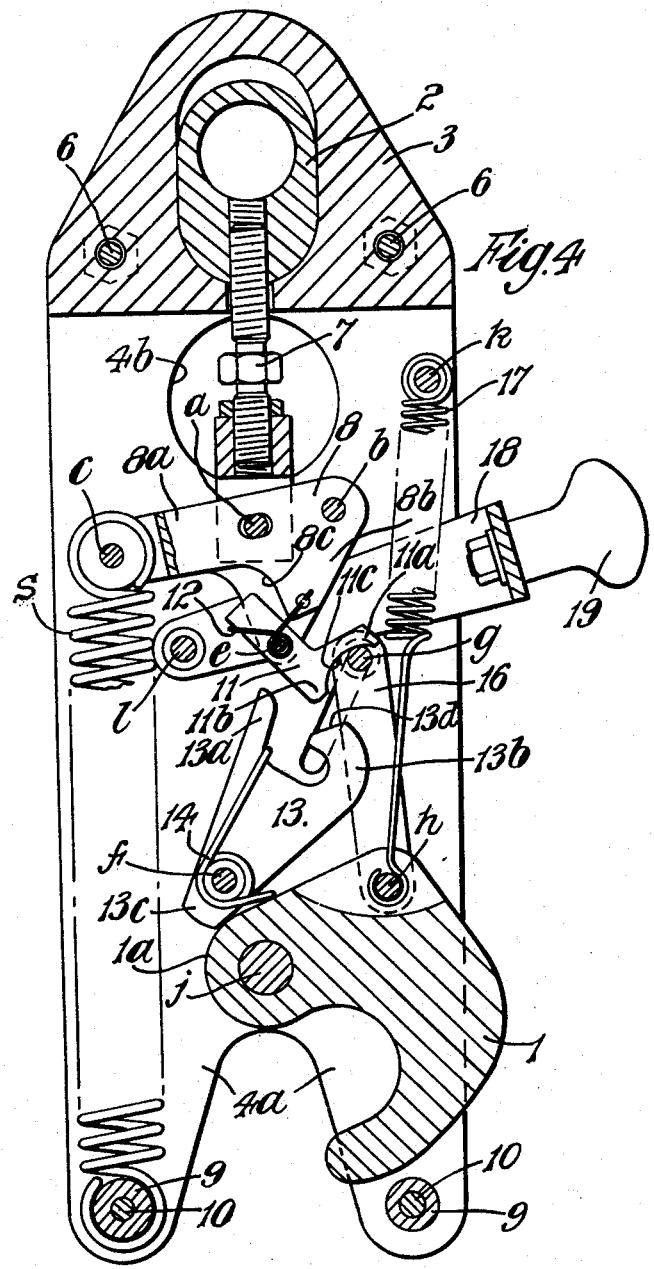
FIGURE 4 shows a view of the hook assembly similar to FIGURE 1 when in the release position and bearing no load.

In some of the figures above some of the parts have been deliberately left unhatched for better appreciation of invention.

The automatic release hook assembly is shown in FIGURE 1 in the position it would occupy when it is carrying full load. This particular embodiment is designed to start unlocking the assembly when the load reduces to 160 lb. and to release when the load reduces further to 50 lb. These loads are quoted by way of example and represent the first and second predetermined loads respectively and are not intended to limit the scope of the invention. Thus full load for the purpose of this description is deemed to be any load in excess of 160 lb. Also for the purposes of description it will be assumed that the hook is disposed vertically as shown in the drawings as in the manner it will be used.

The load is carried between a hook member 1 and an eye 2, the latter being allowed to move over a limited vertical distance in the bearing plate 3 of the assembly with respect to the side plates 4 and 5 (FIGURE 2) which are of similar shape and are spaced apart from each other to allow other parts of the hook assembly to be mounted on and between them. The side plates 4 and 5 are secured to the bearing plate 3 by the nut and bolt assemblies 6. The eye 2 is connected by a turnbuckle 7 to a bell crank lever 8 at a free pin $a$, i.e., a pin not engaging the side plates 4 and 5 (see FIGURE 2). The bell crank lever 8 is pivoted on the side plates 4 and 5 at a pin $b$ and is adapted to swing about the latter.

Attached to one end $8a$ of the bell crank lever 8 at a free pin $c$ is one end of a powerful tension spring S the opposite end of which is anchored at one of the spacers 9 which keep the side plates 4 and 5 apart at the lower end of the hook assembly. The spacers 9 are hollow and nut and bolt assemblies 10 hold the side plates in spaced relation with the spacers 9 between them. The lower end $8b$ of the bell crank lever 8 is narrower than the remainder (see FIGURE 2) and a bifurcated lever 11 of substantially L-shape is pivoted on it at a free pin $e$. This lever 11 is allowed to pivot anti-clockwise from the position shown in FIGURE 1 but cannot pivot clockwise from this position because its upper part is spring-loaded by hair spring 12 into abutment with the adjacent surface $8c$ of the bell crank lever 8. The lower part of the lever 11 is formed in the shape of a foot with a toe $11a$, a heel $11b$ and a radiused portion $11c$ similar to the arch of a foot between the toe and heel.

A swivel lock member 13 is angularly movable about a pin $f$ trunnioned in the side plates 4 and 5 (see FIGURE 2). The pin $f$ passes through the swivel lock member 13 close to the lower end thereof and the upper parts of the swivel lock member are formed as a tongue $13a$ and a lock $13b$. The swivel lock member 13 is spring loaded in an anticlockwise direction as seen in FIGURE 1 so that an extension $13c$ below the pin $f$ abuts the hook 1 on the radiused face $1a$ thereof. A cam slope $13d$ is formed on the end of the lock $13b$. The spring loading is effected by means of the coil spring 14, the ends of which bear on the radiused face $1a$ of the hook 1 and tongue $13a$ respectively. The lock $13b$ partially encircles a sliding pin $g$ which is guided at its extremities in inclined grooves 15 formed in the side plates 4 and 5 (see FIGURE 2).

Two tie plates 6 straddle the swivel lock member 13 and are pivotably secured at their upper ends to the sliding pin $g$. The lower extremities of the tie plates 16 are freely pinned with a free pin $h$ to the hook 1. The hook 1 is trunnioned on the side plates 4 and 5 by the pin $j$, the position of the pin $j$ and the shape of the hook 1 being such that there is no turning moment to open the hook arising from the load carried, i.e., the centre of the pin $j$ is vertically above the loading point of the hook 1.

The lower ends $4a$ and $5a$ of the side plates 4 and 5 are cut away to form with the hook 1 a shackle chamber 21. An aperture $4b$ is cut in the side plate 4 to permit adjustment of the turnbuckle 7.

A tension spring 17 is attached at one end to free pin $h$ and is anchored at the other end to a pin $k$ trunnioned in the side plates 4 and 5.

A handle comprising a U-shaped lever 18 and a knob 19 is pinned to the side plates at pin *l*, the lower edges of the lever 18 being adapted to contact small bearings 20 on the sliding pin *g* each of these being positioned between the tie plate 16 and one side of the side plates 4 or 5.

From the fully loaded position shown in FIGURE 1 the operation of the hook assembly is as follows.

As the raft weighing more than 160 lbs., supported by the hook assembly enters the water, the increasing buoyancy relieves the load on the hook assembly. When the load on the hook reaches approximately 160 lbs. the tension spring S begins to rotate the bell crank lever 8 in an anti-clockwise direction about the pin *b*. The eye 2 moves downwards to permit this. A pre-set amount of movement between the tongue 13a and the heel 11b of the L-shaped lever 11 is first taken up and then with continued movement of the bell crank member 8 in an anti-clockwise direction the lever member 11 displaces the swivel lock member 13 in a clockwise direction and in doing so frees the sliding pin *g* from retention by the lock 13b, to make it possible for the sliding pin *g* to travel along its groove 15 when this becomes necessary. This state is finally achieved when the load has fallen to approximately 100 lbs. Up to this time the hook has remained locked in position by the action of the lock 13b on the sliding pin *g* thus preventing the sliding pin *g* and the tie plates 16 from moving upwards to release the hook. In this position which is shown in FIGURE 3 the toe 11a of the L-shaped lever 11 covers the groove 15 and the hook is unlocked.

The tension spring 17 exerts a turning movement on the hook 1 tending to open it, through the pin *h* but is resisted by the friction forces exerted on the hook 1 by the remaining raft weight. As the load finally decreases due to the effect of buoyancy to approximately 50 lbs. the friction force is finally overcome by the tension spring 17 and the hook 1 opens by rotating about the pin *j*. This is shown in FIGURE 4. When the hook 1 opens the two tie plates 16 are displaced with the hook pushing the slide pin *g* along the grooves 15. The slide pin *g* contacts the toe 11a of the L-shaped lever 11 and rotates it in an anti-clockwise direction about the pin *e* until full travel of the slide pin *g* is achieved. The bell crank lever 8 is restrained from further angular movement in an anti-clockwise direction because the eye 2 is limited in its travel in the end 3 of the hook assembly. When the heel 11b of the L-shaped lever 11 overrides the tongue 13a of the swivel lock member 13 the latter is returned to its original position by its spring 14.

The lever 18 may be spring loaded in an anti-clockwise direction in which case it will always take up the dotted position shown in FIGURE 1 when released. If it is not spring loaded its weight always rests on the bearings 20 on the sliding pin *g* and will be carried up with the latter when it moves to the upper end of the grooves 15.

To re-lock the hook assembly after the raft has been deposited on the water and the hook assembly rehoisted to the deck of the ship, a shackle of another raft is fitted into the shackle chamber 21 and the handle 19 and lever 18 are pulled down. This action pushes the slide pin *g* down the grooves 15 and the tie plates 16 attached to the slide pin *g* rotate the hook 1 about its pivot pin *j* to enclose the shackle. This movement also tensions the spring 17.

During the downward movement of the slide pin *g* it engages the sloping cam face 13d on the lock 13b of the swivel member 13 and the swivel member 13 is pressed in a clockwise direction to allow the slide pin *g* to be partly enclosed by the lock 13b. The coil spring 14 then returns the swivel member 13 to the locking position thus retaining the slide pin *g*, tie plates 16 and hook 1 in the closed position.

The L-shaped lever 11 now free from the slide pin *g* is on the opposite side of the tongue 13a to the side it needs to be on for tripping the lock 13b, i.e., it is not cocked. When the next loaded raft is raised from the deck of the ship preparatory to its being lowered overboard the load on the bell crank lever 8 due to the spring S is overcome and the bell crank lever 8 is rotated clockwise about pin *b*. The L-shaped lever 11 is carried with it and the free travel mentioned before between the heel 11b and the tip of the tongue 13a as well as the cut-away portion 11c at the bottom of the lever 11 allow the latter to over-ride the tongue 13a of the swivel member 13 and snap into the original position. The hook assembly in this configuration is then ready to repeat the cycle of operations just described.

The hook assembly has the advantage that once the lever 18 has been pulled the hook cannot normally be unlocked until the raft has been raised from the deck and is actually floating in the water.

In order to provide emergency unlocking or for purposes of routine test, etc., auxiliary unlocking can be effected by securing a lanyard or the like to the swivel lock member 13 and running it over conveniently placed guide members so that a pull on the lanyard will rotate the swivel member to the unlocked position. The swivel member acts as a locking means to lock the hook 1 in shackle holding position. The bell crank lever 8 acts as an unlocking means to move the locking means to unlocking position when the weight of the load falls below the force of the spring S. This, however, does not cause the hook 1 to swing to a position to release the load inasmuch as the engagement of the load on the hook is in the line from the pivot of the hook to the load. The spring 17 acts to pull the hook to release position. As stated above, the springs S and 17 may be selected with a view to the load conditions to operate the unlocking means and the swinging of the hook.

Having now described my invention, what I claim is:

1. A load carrying release hook assembly which comprises a shackle retaining hook movable to a position to engage and hold a shackle, spring means to swing said hook to a position to release said shackle, a locking means spring pressed to lock said hook in shackle holding position, an unlocking means to move said locking means to release said hook, a spring biasing said unlocking means to unlock said locking means thereby to release said hook, and means actuated by the weight of a load supported by said hook against the force of said spring to hold said unlocking means inoperative when the weight of said load supported by said hook is sufficient to overcome the force of said spring and to release said unlocking means when the load supported by said hook is less than the force of said spring.

2. The assembly of claim 1 in which said means to hold said unlocking means inoperative comprises a load carrying connection secured to said unlocking means in opposition to said spring.

3. The assembly of claim 2 in which said hook is pivoted to swing from holding to release position and said locking means comprise a pin connected to said hook eccentrically of its pivot and a swivel member pivoted to engage said pin.

4. The assembly of claim 3 in which said swivel member comprises a hook portion to engage and hold said pin and a tongue and in which said unlocking means comprises a bell crank lever having one arm connected to said spring and a second arm positioned to engage said tongue and swing said swivel member to disengage said pin when said bell crank lever is tilted by said spring.

5. The assembly of claim 4 in which said second arm of said bell crank lever comprises a stop and an attachment pivoted on said second arm and a spring pressed against said arm to engage the tongue of said swivel member when said arm is tilted to engage and move said swivel member to unlocking position and to override said tongue on reverse movement.

6. The assembly of claim 5 in which said attachment comprises a heel positioned to engage said tongue of said swivel member and a toe portion to be engaged by said pin when said pin moves to unlocking position thereby to clear said heel portion from said tongue.

7. The assembly of claim 3 further comprising a pair of spaced plates having opposed grooves to receive and guide said pin.

8. The assembly of claim 7 in which said swivel member of said locking means comprises a hook portion to hold said pin in position and to release said pin when said locking means is unlocked, said hook portion having a cam slope edge positioned to be displaced by said pin when said pin is moved in said grooves to locked position and then return to lock said pin.

9. The assembly of claim 8 further comprising a pair of spaced side plates on opposite sides of said hook and having recesses extending toward the pivotal axis of said hook to receive a shackle engaged by said hook, said hook having a part extending transversely of said recesses when said hook is in locked position.

10. The assembly of claim 9 further comprising a pair of plates connecting said hook to said pin.

11. The assembly of claim 10 further comprising a manually operable handle pivoted on said side plates and extending across said pin in position to move said pin into locked position.

References Cited in the file of this patent

UNITED STATES PATENTS 2,858,161     Smith _____ Oct. 28, 1958

FOREIGN PATENTS 158,304     Great Britain _____ of 1921